US009235283B2

(12) United States Patent
Setlak et al.

(10) Patent No.: US 9,235,283 B2
(45) Date of Patent: *Jan. 12, 2016

(54) ELECTRONIC DEVICE INCLUDING BLURRED FINGER IMAGE DEBLURRING CIRCUITRY AND RELATED METHODS

(71) Applicant: Apple Inc., Cupertino, CA (US)

(72) Inventors: Dale R Setlak, Melbourne, FL (US); Giovanni Gozzini, Berkeley, CA (US); Martin Subert, Bohemia (CZ); Petr Kohout, Bohemia (CZ); Pavel Mrazek, Bohemia (CZ)

(73) Assignee: APPLE INC., Cupertino, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/959,983

(22) Filed: Aug. 6, 2013

(65) Prior Publication Data

US 2015/0042595 A1 Feb. 12, 2015

(51) Int. Cl.
G06F 3/041 (2006.01)
G06K 9/00 (2006.01)

(52) U.S. Cl.
CPC ............ *G06F 3/041* (2013.01); *G06K 9/00006* (2013.01)

(58) Field of Classification Search
CPC ............. G06K 9/00006; G06K 9/0002; G06F 2203/0338
See application file for complete search history.

(56) References Cited

U.S. PATENT DOCUMENTS

| 5,940,526 | A | 8/1999 | Setlak et al. |
| 5,963,679 | A | 10/1999 | Setlak |
| 6,088,471 | A | 7/2000 | Setlak et al. |
| 2002/0067845 | A1* | 6/2002 | Griffis ........................... 382/107 |
| 2002/0125437 | A1* | 9/2002 | Izumi et al. ............... 250/370.01 |
| 2006/0153431 | A1* | 7/2006 | Ando .............................. 382/124 |
| 2012/0085822 | A1* | 4/2012 | Setlak et al. .................. 235/439 |
| 2012/0086794 | A1 | 4/2012 | Burcham et al. |
| 2012/0127128 | A1* | 5/2012 | Large et al. .................... 345/175 |
| 2013/0294662 | A1* | 11/2013 | Franza et al. ................. 382/124 |
| 2013/0315451 | A1* | 11/2013 | Franza et al. ................. 382/124 |
| 2013/0341398 | A1* | 12/2013 | Rao ................................ 235/439 |
| 2014/0133714 | A1* | 5/2014 | Ivanov et al. ................. 382/124 |
| 2015/0043791 | A1* | 2/2015 | Setlak et al. .................. 382/124 |

OTHER PUBLICATIONS

Ter Haar Romeny, "Deblurring Gaussian Blur", Front End Vision and Multi-Scale Image Analysis, Multi-Scale Computer Vision Theory and Applications, written in Mathematics, Computational Imaging and Vision, vol. 27, 2003, pp. 277-284.
Lefkimmiatis, "Hessian-Based Norm Regularization for Image Restoration with Biomedical Applications", 2010 IEEE, pp. 1-13.
Goldsmith, "Wireless Communications", Chapter 11, 25 pages, 2005, Cambridge University Press.†
Cheng, "Interpixel Capacitive Coupling", 136 pages, Jan. 1, 2009, Rochester Institute of Technology, RIT Scholar Works.†

* cited by examiner
† cited by third party

*Primary Examiner* — Dorothy Harris
(74) *Attorney, Agent, or Firm* — Allen, Dyer, Doppelt, Milbrath & Gilchrist, P.A.

(57) ABSTRACT

An electronic device may include a finger biometric sensor that may include an array of electric field sensing pixels and image data output circuitry coupled thereto. The electronic device may also include a dielectric layer over the array of electric field sensing pixels and causing electric field diffusion so that the image data output circuitry generates image data corresponding to a blurred finger image. The electronic device may also include deblurring circuitry coupled to the image data output circuitry and capable of processing the image data to produce processed image data representative of a deblurred finger image.

14 Claims, 5 Drawing Sheets

ELECTRONIC DEVICE INCLUDING BLURRED FINGER IMAGE DEBLURRING CIRCUITRY AND RELATED METHODS

FIELD OF THE INVENTION

The present invention relates to the field of electronics, and, more particularly, to electronic devices including finger biometric sensors and related methods.

BACKGROUND OF THE INVENTION

Fingerprint sensors that measure the fingerprint pattern using electric field sensing methods and capacitive sensing methods have become well established. U.S. Pat. Nos. 5,940,526 and 5,963,679 are examples of this type of fingerprint sensor, the entire contents of which are incorporated herein by reference. These systems measure the fingerprint pattern by generating an electric field between the finger and the sensor array, and measuring the spatial fluctuations in field strength at the sensor array caused by the shape of the fingerprint ridge and valley pattern.

In some recent applications, it may be desirable to capture images of fingerprint patterns from fingers that are farther away from the sensor array than is typical with today's technologies. Unfortunately, as the finger gets farther away from the sensor array, for example when a relatively thick dielectric lies between the sensor array and the finger, the relatively thick dielectric between the sensor array and the finger may cause variations in the electric field between the finger and the sensor array. These variations may cause image data generated by the finger sensor to be representative of a blurred image.

SUMMARY

An electronic device may include a finger biometric sensor that, in turn, may include an array of electric field sensing pixels and image data output circuitry coupled thereto. The electronic device may also include a dielectric layer over the array of electric field sensing pixels that causes electric field diffusion so that the image data output circuitry generates image data corresponding to a blurred finger image. The electronic device may also include deblurring circuitry coupled to the image data output circuitry, and that is capable of processing the image data to produce processed image data representative of a deblurred finger image. Accordingly, the electronic device deblurs a blurred finger image caused by electric field diffusion from the dielectric layer.

The electric field diffusion may have a diffusion function associated therewith. The deblurring circuitry may be capable of processing the image data to produce processed image data in accordance with a deblurring function based upon the diffusion function, for example. The diffusion function may include a Gaussian function and the deblurring function comprises an inverse Gaussian function, for example.

The deblurring circuitry may be capable of storing a plurality of deblurring coefficients for the deblurring function. The dielectric layer may have a non-uniform thickness, for example. Accordingly, the deblurring circuitry may be capable of processing the image data to produce image data representative of the deblurred finger image based upon the non-uniform thickness.

The deblurring circuitry may include a deblurring processor, and memory coupled thereto and capable of storing the image data. The finger biometric sensor may further include drive circuitry coupled to the array of electric field sensing pixels, for example. The finger biometric sensor may include a finger coupling electrode adjacent the array of electric field sensing pixels and coupled to the drive circuitry.

A method aspect is directed to a finger biometric method including operating a finger biometric sensor that may include an array of electric field sensing pixels and image data output circuitry coupled thereto, and with a dielectric layer over the array of electric field sensing pixels thereby causing electric field diffusion so that the image data output circuitry generates image data corresponding to a blurred finger image. The method may also include processing the image data using deblurring circuitry coupled to the image data output circuitry to produce processed image data representative of a deblurred finger image.

A non-transitory computer readable medium for finger biometric processing may include computer-executable instructions capable of performing operations. The operations may include operating a finger biometric sensor comprising an array of electric field sensing pixels and image data output circuitry coupled thereto, and with a dielectric layer over the array of electric field sensing pixels thereby causing electric field diffusion so that the image data output circuitry generates image data corresponding to a blurred finger image. The operations may also include processing the image data using deblurring circuitry coupled to the image data output circuitry to produce processed image data representative of a deblurred finger image.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
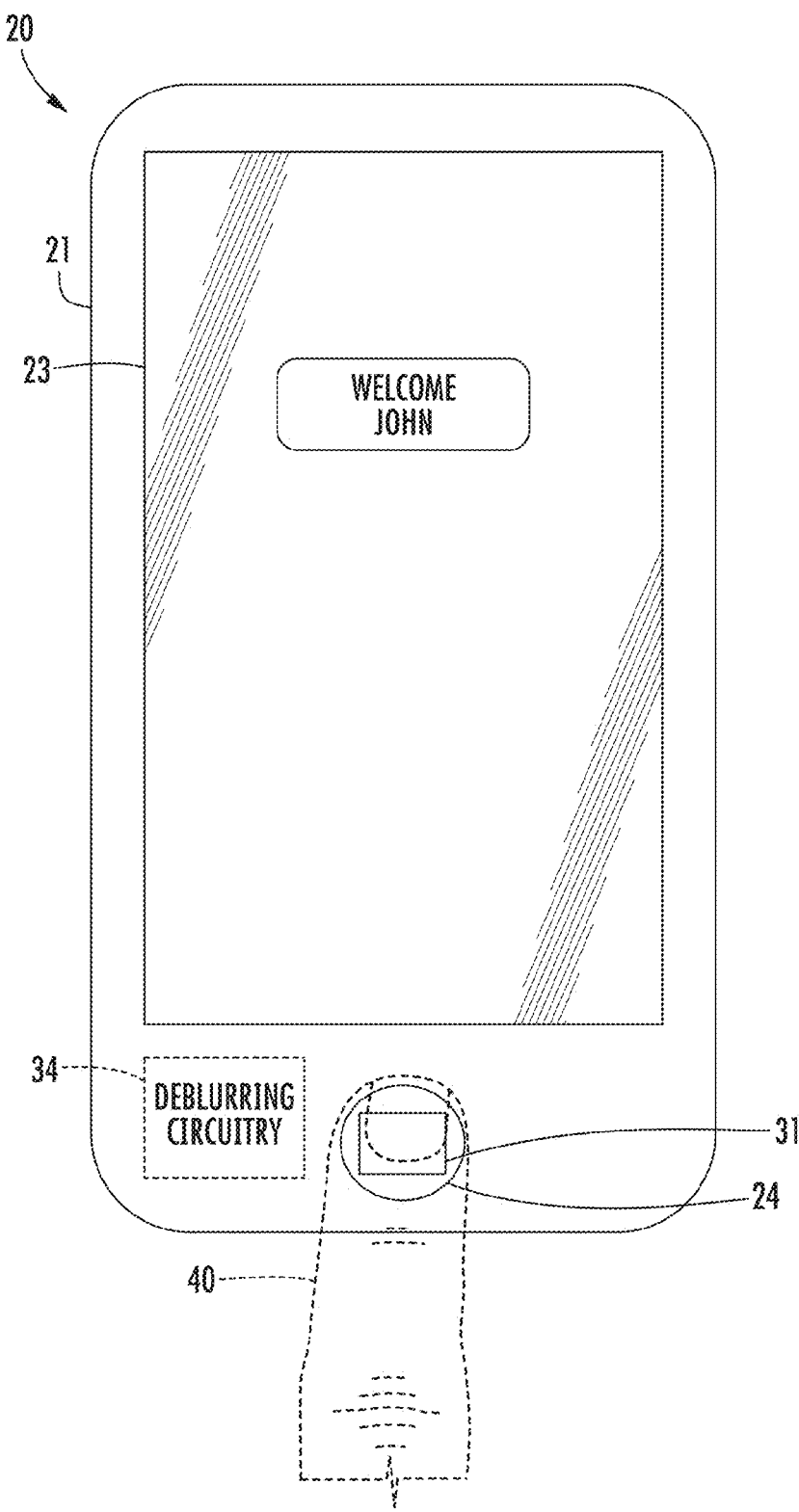
FIG. 1 is a plan view of an electronic device according to the present invention.
Figure 2:
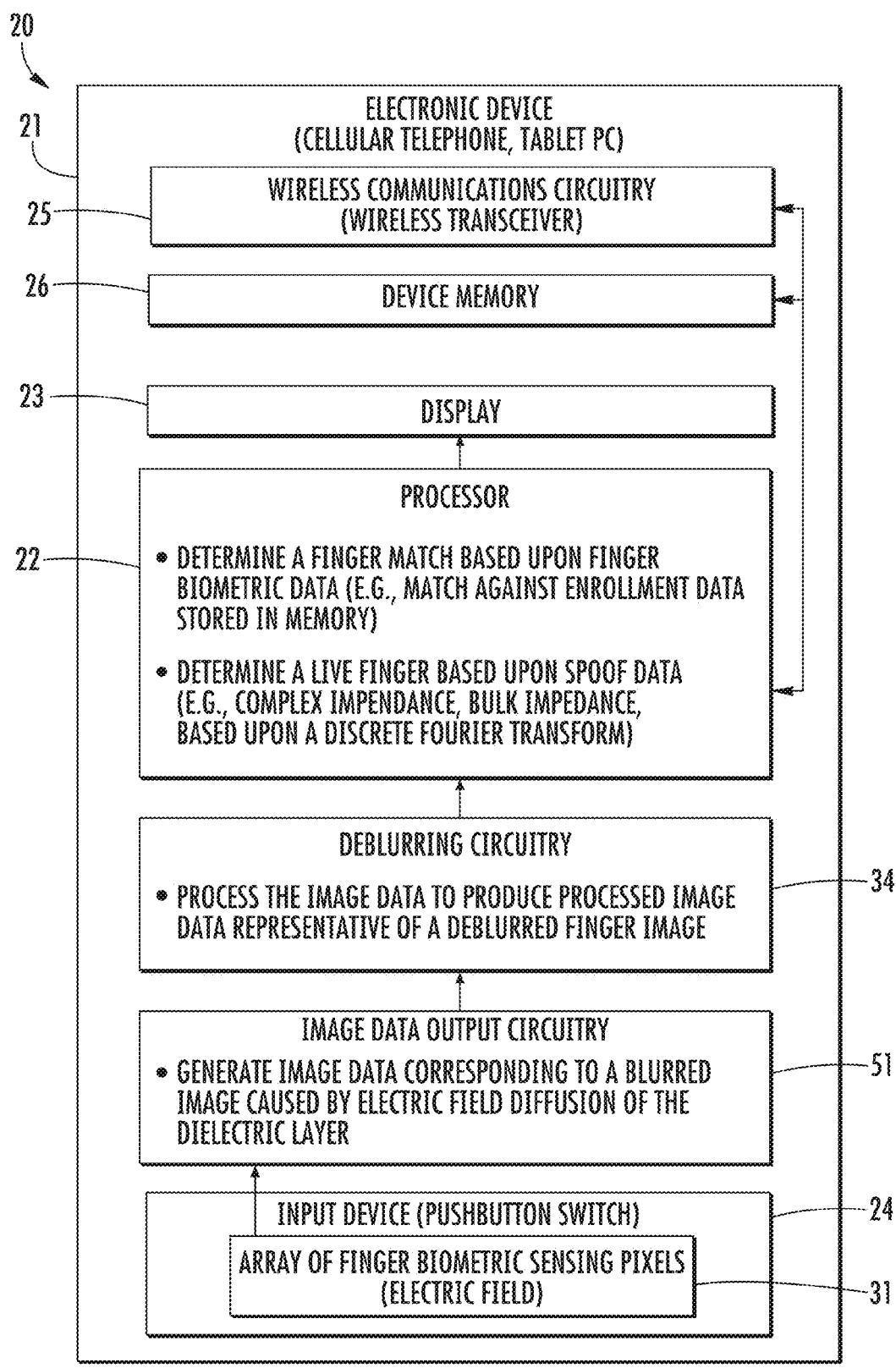
FIG. 2 is a schematic block diagram of the electronic device of FIG. 1.
Figure 3:
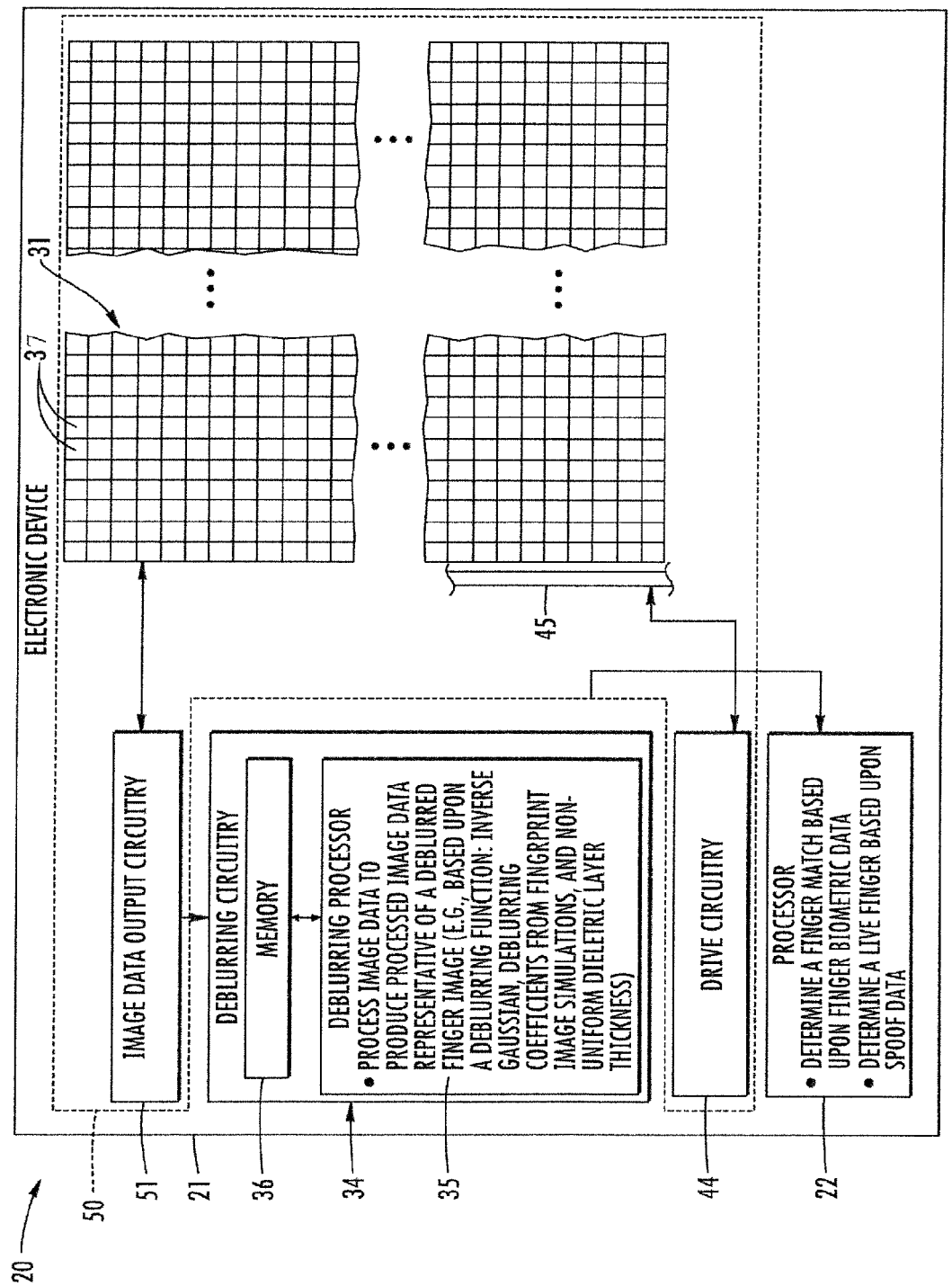
FIG. 3 is a more detailed schematic block diagram of a portion of the electronic device of FIG. 1.

Referring initially to FIGS. 1-3, an electronic device 20 is now described. The electronic device 20 illustratively includes a portable housing 21 and a processor 22, for example a host processor, carried by the portable housing. The electronic device 20 is illustratively a mobile wireless communications device, for example, a cellular telephone. The electronic device 20 may be another type of electronic device, for example, a tablet computer, laptop computer, etc.

Wireless communications circuitry 25 (e.g. a wireless transceiver, cellular, WLAN Bluetooth, etc.) is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25.

A display 23 is also carried by the portable housing 21 and is coupled to the processor 22. The display 23 may be a liquid crystal display (LCD), for example, a touch screen display, or may be another type of display, as will be appreciated by those skilled in the art. A device memory 26 is also coupled to the processor 22.

A finger-operated user input device, illustratively in the form of a pushbutton switch 24, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device may be a different type of finger-operated user input device, for example, forming part of a touch screen display. Other or additional finger-operated user input devices may be carried by the portable housing 21.

The electronic device 20 includes a finger biometric sensor 50, which may be in the form of one or more integrated circuits (ICs). The finger biometric sensor 50 includes an array of electric field sensing pixels 31 that are part of an IC carried by the pushbutton switch 24 to sense a user's finger 40 or an object placed adjacent the array of electric field sensing pixels. Each pixel 37 may be an electric field sensing pixel as disclosed in U.S. Pat. No. 5,940,526 to Setlak et al., for example, assigned to the present assignee, and the entire contents of which are herein incorporated by reference.

The finger biometric sensor 50 also includes image data output circuitry 51 coupled to the array of electric field sensing pixels 31. The array of electric field sensing pixels 31 is carried by the pushbutton switch 24 so that when a user or object contacts and/or presses downward on the pushbutton switch, the image data output circuitry 51 cooperates with the array so that image data from the user's finger 40 is acquired, for example, finger image data for finger matching and/or spoof detection, as will be appreciated by those skilled in the art.

In other words, the array of electric field sensing pixels 31 may cooperate with the image data output circuitry 51 to be responsive to static contact or placement of the user's finger 40 or object. Of course, in other embodiments, for example, where the array of electric field sensing pixels 31 is not carried by a pushbutton switch, the array of electric field sensing pixels may cooperate with the image data output circuitry 51 to be responsive to sliding contact (i.e. a slide sensor), or responsive to static placement (i.e. a standalone static placement sensor).

Figure 4:
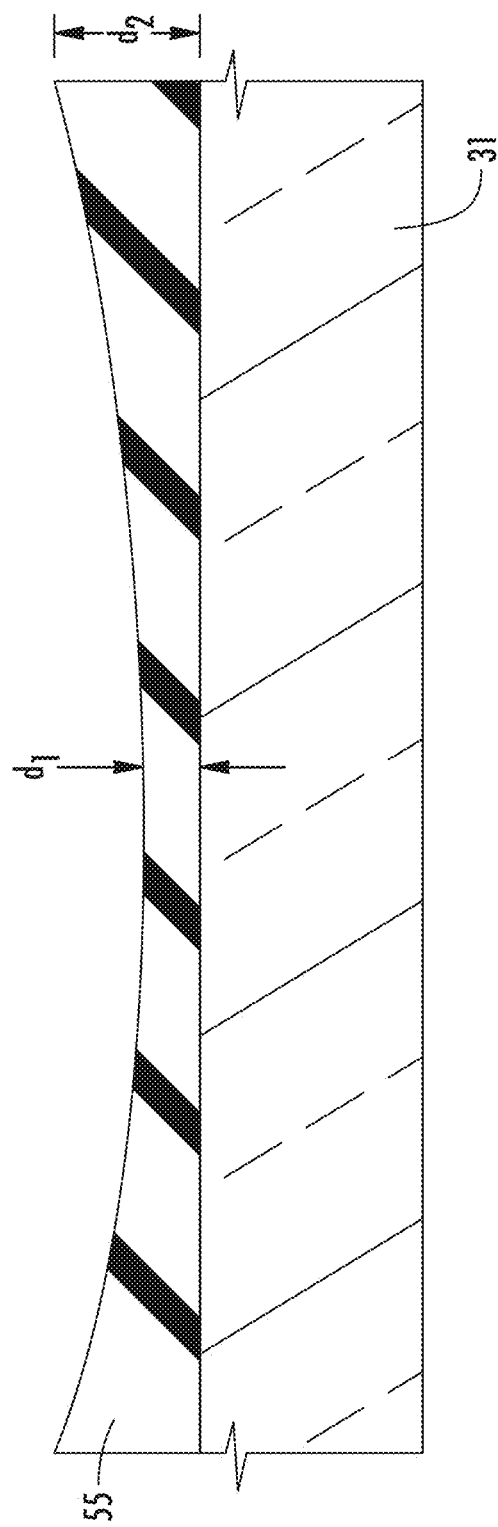
FIG. 4 is a schematic cross-section of a portion of a dielectric layer covering the array of electric field sensing pixels in accordance with the present invention.

Referring now additionally to FIG. 4, a dielectric layer 55 is over the array of electric field sensing pixels 31. The dielectric layer 55 may be a protective layer of dielectric material or for aesthetics, and, for example, in some embodiments, may be part of the display 23 and/or may also be carried by the pushbutton switch 24. It should be understood that the dielectric layer 55 is generally not a passivation layer when the finger biometric sensor 50 is in the form of an IC, for example.

Figure 5A:
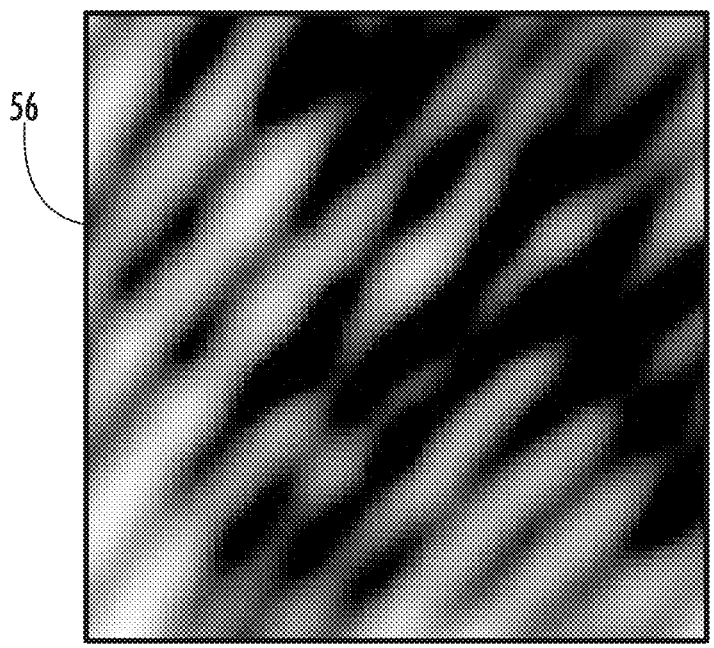
FIG. 5a is a blurred finger image caused by a dielectric layer, for example, as illustrated in FIG. 4.

The dielectric layer 55 causes an electric field diffusion. The electric field diffusion causes the image data output circuitry 51 to generate image data that corresponds to a blurred image. In other words, a finger image or fingerprint image generated from image data collected from the user's finger 40 is blurred, for example, as illustrated in the blurred finger image 56 in FIG. 5a. A blurred finger image may make it increasingly difficult to perform, for example, a matching operation, spoof detection operation, or other operation based upon the finger image. The electric field diffusion has a diffusion function associated therewith, for example, a Gaussian function.

Figure 5B:
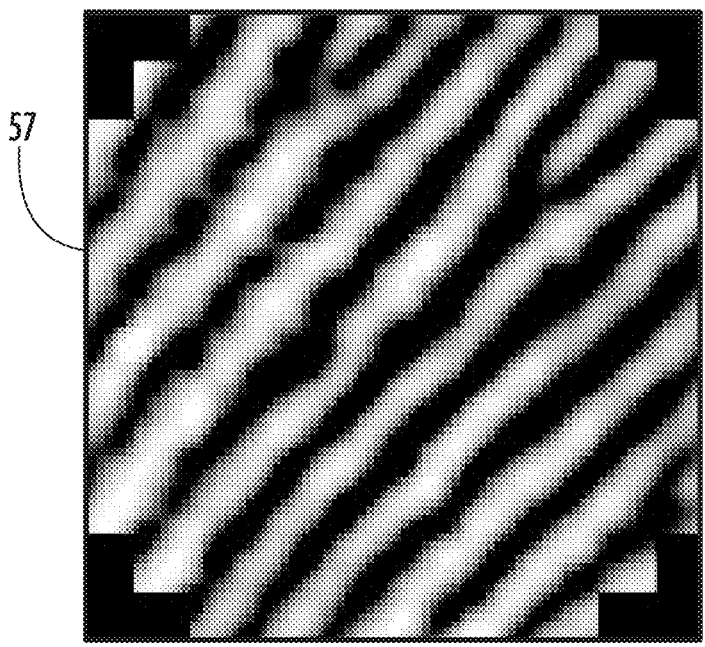
FIG. 5b is a deblurred finger image processed by the deblurring circuitry of the electronic device of FIG. 3.

The electronic device 20 also includes deblurring circuitry 34 coupled to the image data output circuitry 51. The deblurring circuitry 34 includes a deblurring processor 35 and memory 36 coupled thereto for storing the image data. The deblurring processor 35 is capable of processing the image data to produce processed image data representative of a deblurred finger image. For example, a deblurred finger image 57 processed by the deblurring circuitry 34 is illustrated in FIG. 5b. In particular, the deblurring processor 35 is capable of processing the image data to produce processed image data in accordance with a deblurring function based upon the diffusion function, for example, an inverse Gaussian function when the electric field diffusion has a Gaussian function associated therewith.

It should be understood that in some embodiments, the deblurring circuitry 34 may be part of or included in the processor 22. In other words, the functionality described herein with respect to the deblurring processor 35 may be performed by the processor 22, another processor, or shared between or among processors. Similarly, the memory 36 of the deblurring circuitry 34 may be shared with or included within the device memory 26.

In some embodiments, the dielectric layer 55 may have a non-uniform thickness. For example, the dielectric layer 55 may be curved, or the non-uniform thickness may be a result of manufacturing variances (FIG. 4) and may have a thickness that varies between 100 um-500 um. In particular, for a curved dielectric layer 55, the dielectric layer may have a first thickness d1 near the center while the ends may have a second thickness d2.

The deblurring processor 35 is capable of processing the image data to produce image data representative of the deblurred finger image based upon the non-uniform thickness. More particularly, the deblurring processor 35 may cooperate with the memory 36 to apply a deblurring function that is based also upon the thickness of the dielectric layer 55. For example, different coefficients of the deblurring function may be associated with different thicknesses of the dielectric layer 55 so that the variations of thickness across the dielectric layer are accounted for in a deblurring operation. Of course, the deblurring processor 35 may perform other or additional deblurring techniques to produce image data representative of the deblurred finger image based upon the non-uniform thickness. For example, a given one of multiple deblurring functions may be applied to a region of the array 31 as will be appreciated by those skilled in the art.

In some embodiments, the deblurring processor 35 is capable of storing deblurring coefficients for the deblurring function. For example, the deblurring processor 35 may be capable of storing deblurring coefficients in the memory 36 based upon a plurality of fingerprint image simulations. The deblurring coefficients may be generated by the deblurring processor 35, the processor 22, and/or another processor, for example, that may be remote from the electronic device 20. The deblurring function may be heuristically derived, or a learning function may be performed with respect to the coefficients. The deblurring function may thus be attempted with different coefficients across fingerprint images to determine which coefficients result in increased deblurring of the generated image data. Additional techniques may be used for deblurring or reducing the electric field diffusion using an anisotropic dielectric layer, for example as described in U.S. Pat. No. 6,088,471 to Setlak et al. and assigned to the present assignee, and the entire contents of which are herein incorporated by reference.

The processor 22 may also cooperate with the array of electric field sensing pixels 31 to determine a finger match based upon finger biometric data. More particularly, the processor 22 may determine a finger match based upon enrollment data stored in the device memory 26. The processor 22 may also determine a live finger based upon spoof data. More particularly, the processor 22 may determine a live finger based upon a complex impedance and/or bulk impedance measurement.

In some embodiments, the processor 22 may cooperate with the array of electric field sensing pixels 31 to perform a navigation function, for example. Of course the processor 22 may cooperate with the array of electric field sensing pixels 31 and/or other circuitry to perform other or additional functions, as will be appreciated by those skilled in the art.

The finger biometric sensor 50 also includes drive circuitry 44 coupled to the array of electric field sensing pixels 31 and a finger coupling electrode 45 adjacent the array of electric field sensing pixels 31 and coupled to the drive circuitry. The array of electric field sensing pixels 31 cooperates with the drive circuitry 44 to couple the user's finger 40 to a reference and generate a detected signal based upon placement of the user's finger 40 adjacent the array of electric field sensing pixels, as will be appreciated by those skilled in the art. Further details of example drive circuitry 44 and finger coupling electrode are described in U.S. Pat. No. 5,963,679, to Setlak and assigned to the present assignees, and the entire contents of which are herein incorporated by reference. As will be appreciated by those skilled in the art, additional noise or finger image compensation techniques may be used in conjunction with the deblurring circuitry 34.

A method aspect is directed to a finger biometric method that includes operating a finger biometric sensor 50 that includes an array of electric field sensing pixels 31 and image data output circuitry 51 coupled thereto. A dielectric layer 55 is over the array of electric field sensing pixels thereby causing electric field diffusion so that the image data output circuitry generates image data corresponding to a blurred finger image. The method includes processing the image data using deblurring circuitry 34 coupled to the image data output circuitry 51 to produce processed image data representative of a deblurred finger image.

A non-transitory computer readable medium for finger biometric processing aspect includes computer-executable instructions capable of performing operations that may include operating a finger biometric sensor 50 that includes an array of electric field sensing pixels 31 and image data output circuitry 51 coupled thereto. A dielectric layer 55 is over the array of electric field sensing pixels 31 thereby causing electric field diffusion so that the image data output circuitry generates image data corresponding to a blurred finger image. The computer-executable instructions are for also performing the operation processing the image data using deblurring circuitry 34 coupled to the image data output circuitry 51 to produce processed image data representative of a deblurred finger image.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a finger biometric sensor comprising an array of electric field sensing pixels and image data output circuitry coupled thereto;
   a dielectric layer over the array of electric field sensing pixels and causing electric field diffusion having a diffusion function associated therewith so that the image data output circuitry generates image data corresponding to a blurred finger image; and
   deblurring circuitry coupled to the image data output circuitry and capable of
     storing a plurality of deblurring coefficients for a deblurring function, and
     processing the image data to produce processed image data representative of a deblurred finger image and in accordance with the deblurring function based upon the diffusion function.

2. The electronic device of claim 1, wherein the diffusion function comprises a Gaussian function and the deblurring function comprises an inverse Gaussian function.

3. The electronic device of claim 1, wherein the dielectric layer has a non-uniform thickness; and wherein the deblurring circuitry is capable of processing the image data to produce image data representative of the deblurred finger image based upon the non-uniform thickness.

4. The electronic device of claim 1, wherein the deblurring circuitry comprises a deblurring processor and memory coupled thereto and capable of storing the image data.

5. An electronic device comprising:
   a finger biometric sensor comprising an array of electric field sensing pixels and image data output circuitry coupled thereto;
   drive circuitry coupled to the array of electric field sensing pixels;
   a dielectric layer over the array of electric field sensing pixels and causing electric field diffusion having a diffusion function associated therewith so that the image data output circuitry generates image data corresponding to a blurred finger image; and
   deblurring circuitry coupled to the image data output circuitry and capable of
     storing a plurality of deblurring coefficients for a deblurring function, and
     processing the image data to produce processed image data representative of a deblurred finger image in accordance with the deblurring function based upon the diffusion function.

6. The electronic device of claim 5, wherein the diffusion function comprises a Gaussian function and the deblurring function comprises an inverse Gaussian function.

7. The electronic device of claim 5, wherein the dielectric layer has a non-uniform thickness; and wherein the deblurring circuitry is capable of processing the image data to produce image data representative of the deblurred finger image based upon the non-uniform thickness.

8. The electronic device of claim 5, wherein the finger biometric sensor comprises a finger coupling electrode adjacent the array of electric field sensing pixels and coupled to the drive circuitry.

9. A finger biometric method comprising:
operating a finger biometric sensor comprising an array of electric field sensing pixels and image data output circuitry coupled thereto, and with a dielectric layer over the array of electric field sensing pixels thereby causing electric field diffusion having a diffusion function associated therewith so that the image data output circuitry generates image data corresponding to a blurred finger image; and
processing the image data using deblurring circuitry coupled to the image data output circuitry by storing a plurality of deblurring coefficients for a deblurring function and producing processed image data representative of a deblurred finger image and in accordance with the deblurring function based upon the diffusion function.

10. The method of claim 9, wherein the diffusion function comprises a Gaussian function and the deblurring function comprises an inverse Gaussian function.

11. The method of claim 9, wherein the dielectric layer has a non-uniform thickness; and wherein processing the image data using the deblurring circuitry comprises processing the image data using the deblurring circuitry to produce image data representative of the deblurred finger image based upon the non-uniform thickness.

12. A non-transitory computer readable medium for finger biometric processing, the non-transitory computer readable medium comprising computer-executable instructions capable of performing the operations comprising:
operating a finger biometric sensor comprising an array of electric field sensing pixels and image data output circuitry coupled thereto, and with a dielectric layer over the array of electric field sensing pixels thereby causing electric field diffusion having a diffusion function associated therewith so that the image data output circuitry generates image data corresponding to a blurred finger image; and
processing the image data using deblurring circuitry coupled to the image data output circuitry by storing a plurality of deblurring coefficients for a deblurring function and producing processed image data representative of a deblurred finger image and in accordance with the deblurring function based upon the diffusion function.

13. The non-transitory computer readable medium of claim 12, wherein the diffusion function comprises a Gaussian function and the deblurring function comprises an inverse Gaussian function.

14. The non-transitory computer readable medium of claim 12, wherein the dielectric layer has a non-uniform thickness; and wherein processing the image data using the deblurring circuitry comprises processing the image data using the deblurring circuitry to produce image data representative of the deblurred finger image based upon the non-uniform thickness.

* * * * *